July 4, 1950
D. E. ANDERSON
2,513,773
SUPPLEMENTARY FEED DEVICE FOR
INTERNAL-COMBUSTION ENGINES
Filed May 27, 1946
2 Sheets-Sheet 1
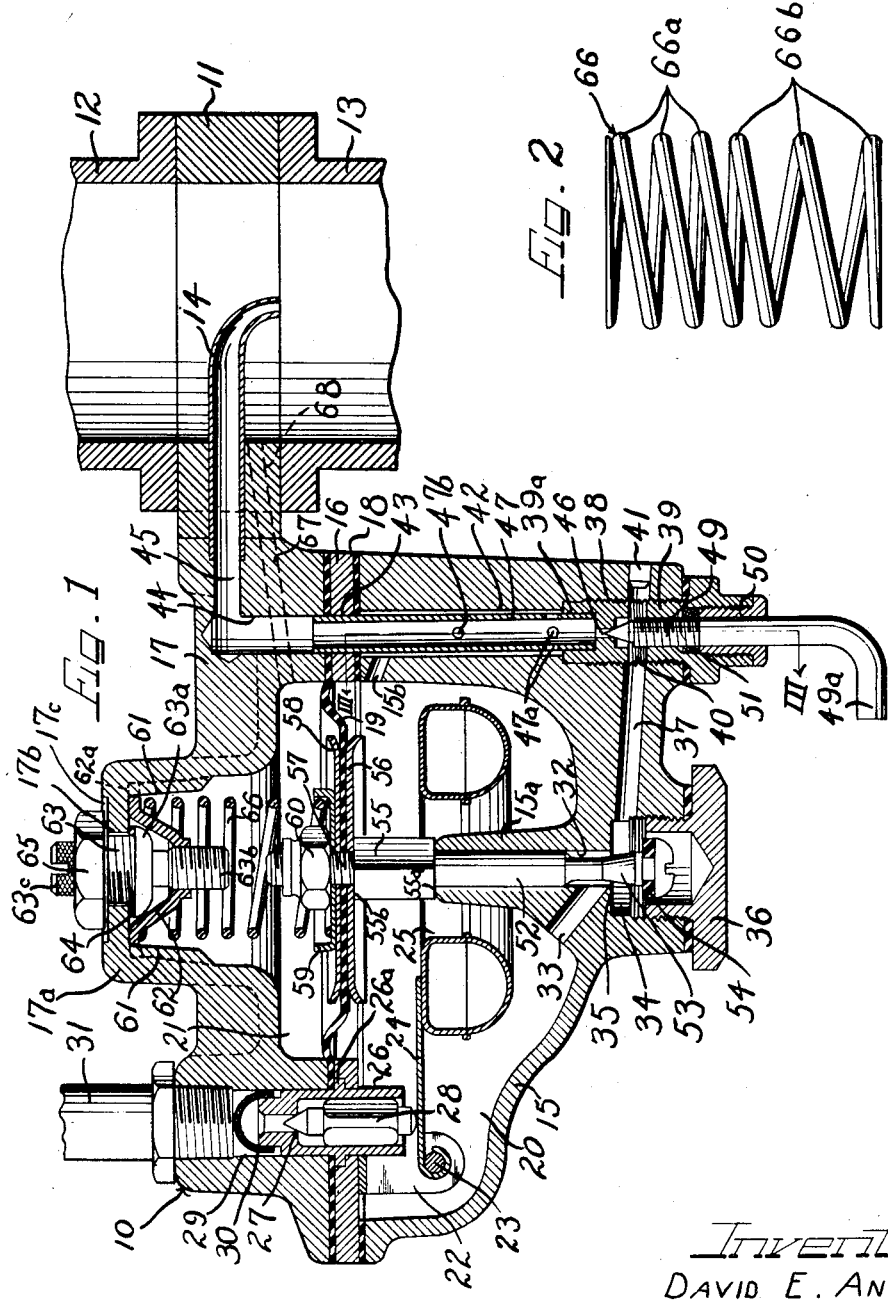
Inventor
DAVID E. ANDERSON July 4, 1950

D. E. ANDERSON 2,513,773

SUPPLEMENTARY FEED DEVICE FOR
INTERNAL-COMBUSTION ENGINES

Filed May 27, 1946

Inventor
David E. Anderson.

Patented July 4, 1950

2,513,773

UNITED STATES PATENT OFFICE 2,513,773

SUPPLEMENTARY FEED DEVICE FOR INTERNAL-COMBUSTION ENGINES

David E. Anderson, Cleveland, Ohio, assignor to Thompson Products, Inc., Cleveland, Ohio, a corporation of Ohio Application May 27, 1946, Serial No. 672,504

8 Claims. (Cl. 261—69)

This invention relates to devices for feeding controlled amounts of coolant or antiknock fluid to the fuel intake of an internal combustion engine. Specifically, the invention deals with a vacuum controlled supplemental feed device for engines having adjustable valve means that are easily regulated to vary the rates and conditions of feed for maintenance of optimum service conditions.

Feeding of auxiliary liquids, such as water, alcohol, or the like, to internal combustion engines for the purpose of suppressing engine detonation and for increasing power delivery of the engine is known. It is also known that engine detonation varies with the quality of main fuel being burned and usually increases with engine speed and then decreases and disappears.

The peak knock point of each engine will vary somewhat and if expensive auxiliary liquids, like alcohol, are to be used for suppressing engine detonation, it is most economical to feed these liquids only when actually needed and then only in amounts that are just sufficient to carry out their function.

In view of the fact that most detonation suppressing liquids, including water and alcohol, are immiscible with the main fuel such as gasoline it is desirable to feed a spray or jet of the liquid into the atomized gasoline for effecting a good intermingling of the two materials. If the detonation suppressing liquid has a fuel value, like alcohol for example, its jet or spray should contain sufficient air to insure thorough combustion and utilization of the fuel value.

Since suction or vacuum in the engine intake varies inversely with the engine speed and throttle opening, this vacuum has been used as an actuator for opening and closing a feed valve for the auxiliary liquid. However, the prior known supplementary feed devices have not been readily adjustable to compensate for variations in quality of main fuel and for peculiarities of individual engines so as to feed just the right quantity of supplemental liquid at just the right time. The devices of the present invention are equipped with adjustable controls which are easily regulated to meet the different operating conditions encountered with different engines and fuels.

The devices of this invention include a metering valve controlled by a vacuum operated diaphragm and a spring, together with a jet orifice receiving liquid from the metering valve and discharging through an air vented tube to the intake of the engine. The jet orifice can be equipped with an adjustable needle valve. When the engine is stopped, the spring forces the metering valve to fully opened position thereby permitting anti-detonant liquid to flow into the air vented tube for filling the tube and making available a charge of supplemental fuel that is fed to the engine as soon as it is started. The tube is equipped with air vents at different levels to bleed air into the engine in increasing amounts as the tube empties thereby neutralizing the effect of engine vacuum on the orifices of the device and feeding additional air to the engine for supporting combustion of the supplemental fuel and for adding more air to the already aerated main fuel. The engine carburetor is vented through the air tube even when the metering valve of the supplementary feed device is closed and receives additional air to maintain thorough combustion of the main fuel. Since the main fuel usually requires more air for thorough combustion than the supplementary fuel, the air tube automatically decreases the amount of air fed to the engine as the tube fills with supplementary fuel.

A feature of the invention resides in the provision of a dual rate spring coacting with the vacuum controlled diaphragm for controlling the metering valve. While the increase of intake vacuum moves the metering valve toward closed position, the dual rate spring resists this vacuum actuation of the metering valve first with a light load and then with a heavier load. Closing of the metering valve thereby occurs at a decreasing rate as vacuum increases.

It is then an object of the present invention to provide a supplemental feed device for the fuel intake of an internal combustion engine whereby supplementary liquids are fed to the engine in amounts just sufficient for suppressing detonation and only at periods of engine operation where detonation will occur.

A still further object of the invention is to provide a supplementary fuel feed device having easily accessible adjustments for setting the device to deliver supplementary fuel in accordance with predetermined flow curves.

A still further object of the invention is to provide an antiknock fluid feed device for internal combustion engines with readily accessible adjustments to vary the calibration of the device in accordance with conditions of engine operation and peculiarities of individual engines.

Another object of the invention is to equip a supplemental fuel feed device with a vent tube which provides for temporary enrichment of fuel feed to the carburetor at the time of starting the engine followed by a decrease in the rate of enrichment in proportion to the decrease of supplemental fuel fed to the engine.

Another object of the invention is to provide a supplementary liquid feeding device for the intake of an internal combustion engine with a readily adjustable metering valve spring.

Other and further objects of the invention will be apparent to those skilled in the art from the following detailed description of the annexed sheets of drawings which, by way of preferred examples only, illustrate one embodiment of the invention, together with charts of operation of the devices of this invention.

On the drawings:

Figure 1 is a vertical cross sectional view of a supplementary feed device according to this invention mounted on an engine intake manifold.

Figure 2 is a side elevational view of a dual rate spring used in the device of Fig. 1.

Figure 4:
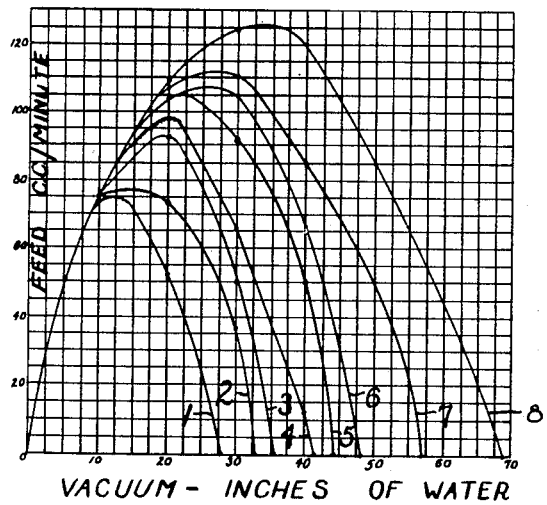
Figure 6:
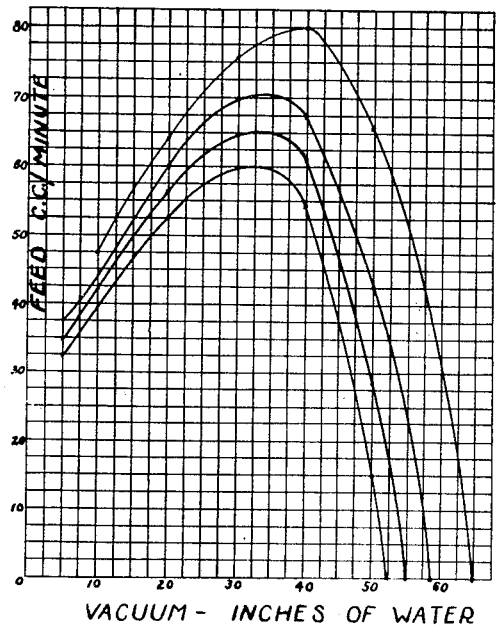
Figure 5:
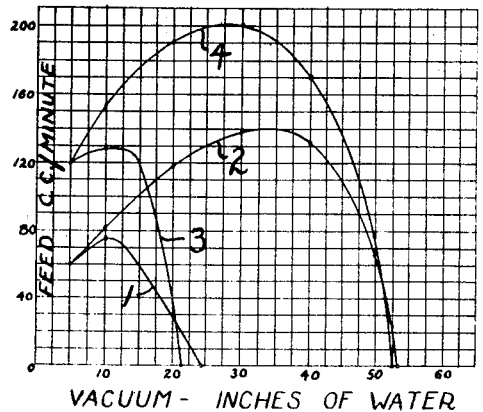

Figures 4 to 6 inclusive are charts of fuel feed curves illustrating the feed characteristics obtainable with the devices of this invention.

As shown on the drawings:

In Fig. 1 the reference numeral 10 designates generally a supplementary feed device according to this invention mounted on a flange or mounting block 11 which is positioned between the outlet of a carburetor 12 and the inlet of an engine intake manifold 13. The block 11 carries a jet tube 14 with an outlet facing downstream in the block 11. The tube as shown projects laterally through the block 11.

The device 10 includes a casing 15, a diaphragm plate 16 and a cover 17. A gasket 18 is provided between the casing 15 and the plate 16. A diaphragm 19 is provided between the plate 16 and the cover 17. The casing 15 defines a float chamber 20. The cover 17 defines a spring chamber 21. The chambers 20 and 21 are separated by the diaphragm 19.

A bracket 22 depends from the plate 16 into the float chamber 20. A pin 23 carried by the bracket 22 pivotally supports an arm 24 carrying an annular float 25. A tubular valve housing 26 extends through the plate 16 and has a flange 26a seated on a shoulder in the plate for supporting the housing. The housing 26 has a valve seat 27 intermediate the ends thereof.

A valve 28 is slidable in the housing and coacts with the seat 27 to control flow of fluid through the housing into the float chamber 20. The arm 24 of the float assembly acts on the valve 28 to move the valve against its seat 27 whenever the float chamber is filled.

The cover 17 has passageway 29 receiving the upper portion of the valve housing 26 therein. A screen or other filter 30 is disposed in the passageway 29 over the top of the valve housing 26. A supply tube 31 for feeding antidetonant material such as a mixture of water and alcohol, to the device 10, is coupled into the passageway 29 of the cover.

The float 25 thereby controls the valve 28 for admitting supplementary fuel to the float chamber 20.

The casing 15 has an upstanding hollow boss portion 15a in the central part of the float chamber 20 thereof. The boss 15a extends into the central aperture of the annular float 25. A passageway 32 is provided through the boss 15a and communicates with the float chamber through ports such as 33 in the bottom of the boss portion. A well 34 is provided in the bottom of the casing 15 and communicates with the passageway 32 to provide a valve seat 35 at the end of the passageway 32. The well 34 is internally threaded and a plug 36 is screwed into the well to close the bottom thereof. A bore 37 extends laterally from the well 34 through the casing 15 to an internally threaded second well 38. A nipple 39 is threaded into this second well 38. The nipple 39 has side ports 40 communicating with the bore 37. The outer end of the bore 37 is closed by a plug 41. The well 38 registers with a passageway 42 extending through the top of the casing 15. A port 15b connects the upper portion of the float chamber 20 with the passageway 42. The plate 16 has an aperture 43 therethrough of slightly smaller diameter than the passageway 42 but aligned therewith. The cover 17 has a passageway 44 extending from the aperture 43 into spaced relation from the top of the cover. This passageway 44 is joined with a lateral passageway 45 opening through the flanged side wall of the cover which mates with the block 11. The jet tube 14 carried by the block 11 extends into the passageway 45 as shown.

The nipple 39 has a jet orifice 46 connecting the ports 40 with a metering tube 47 seated freely in the passageway 42 and snugly in a recess 39a in the top of the nipple 39. The tube 47 has a top end portion snugly seated in the aperture 43 of the plate 16 and in the passageway 44 of the cover 17. A plurality of holes 47a are provided in the tube 47 at a level adjacent the top of the nipple 39. Additional holes such as 47b are provided at levels above levels of the holes 47a.

Figure 3:
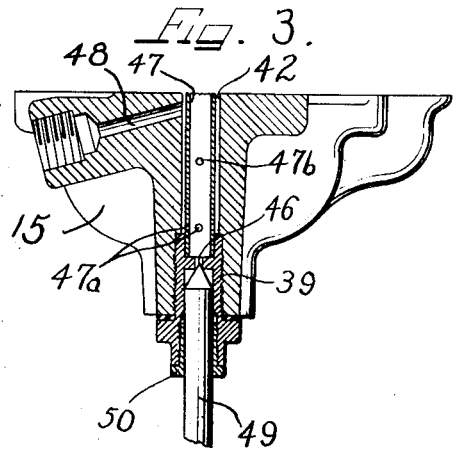
Figure 3 is a fragmentary vertical cross sectional view taken along the line III—III of Fig. 1.

The passageway 42 as best shown in Fig. 3 is vented to the atmosphere through a passageway or bore 48 in the top portion of the casing 15. The interior of the tube 47 is thereby vented to the atmosphere through the holes or ports 47a and 47b and the bore 48.

A needle valve 49 is threaded in the nipple 39 and has a pointed end coacting with the orifice 46 to control flow from the bore 37 to the tube 47. The needle valve 49 extends through the nipple 39 and has a handle 49a below the casing 15 for quick and ready shifting of the setting of the valve. A plug 50 is threaded into the lower end of the nipple 39 and has a bore snugly receiving the shank portion of the needle valve 49 therethrough. Packing material 51 is compressed by the plug 50 in the nipple 39 to seal the shank of the needle valve and prevent leakage out of the bottom of the casing.

A metering valve 52 is slidably mounted in the passageway 32 of the boss portion 15a and has a tapered head 53 coacting with the valve seat 35 to provide an orifice outlet at the bottom of the passageway joining the ports 33 with the bore 37. A sealing washer 54 is carried at the large lower end of the tapered valve head 53 to present a flat sealing face to the valve seat 35 for closing the orifice whenever the metering valve 52 is raised sufficiently to seat the sealing washer 54 on the seating face 35.

A head 55 is provided on the upper end of the valve assembly 52 above the boss portion 15a and provides a first shoulder 55a thrusting against the top of the boss portion 15a to determine the maximum opening of the metering orifice by controlling the lowermost position for the valve head 53. The head 55 provides a second shoulder 55b receiving a metal washer 56 thereon. A threaded shank 57 projects from the head 55 through the washer 56, through the central portion of the diaphragm 19, through a second washer 58, and through a spring retainer 59 into the spring chamber 21. A nut 60 is threaded on this portion 57 and is bottomed on the spring retainer 59 to clamp the diaphragm 19 between the washers 56 and 58.

The cover 17 has a hollow dome portion 17a with internal side ribs 61 disposed vertically therein. A spring retainer 62 is disposed in the dome portion 17a and has peripheral slots receiving the ribs 61 therein. The slots provide shoulders 62a straddling the ribs 61 thereby preventing rotation of the spring retainer.

A screw member 63 fits freely in an aperture 17b formed through the top of the dome portion 17a of the cover. This screw member 63 has a shoulder 63a receiving a sealing washer 64 thereon for sealing engagement with the dome around the aperture 17b. A nut 65 is threaded on the screw member 63 exteriorly of the dome 17a and is bottomed in a recess 17c provided in the top of the dome around the aperture 17b thereof. The nut is tightened to draw the sealing washer 64 into sealing engagement with the dome thereby closing the aperture 17b.

The screw member 63 has a depending threaded portion 63b threaded through the spring retainer 62. A slotted head 63c is provided on the opposite end of the screw member 63. In order to shift the spring retainer 62 nut 65 is loosened and the screw head 63c engaged by a rotating tool. Rotation of the screw member 63 will thereupon shift the spring retainer 62 in the dome 17a along the length of the ribs 61.

A coiled spring 66 is maintained under compression between the retainers 59 and 62. As best shown in Fig. 2, this spring 66 has a group of closely spaced coils 66a at one end thereof and a group of widely spaced coils 66b at the other end thereof. The pitch of the widely spaced coils 66b is therefore much greater than the pitch of the closely spaced coils 66a and the coils 66a will deflect under lighter loads than the coils 66b. The spring 66 thereby has a dual rate and requires only relatively light loads to initially compress it followed by relatively heavy loads to compress it beyond the initial compression stage. This dual rate spring thus allows movement of the retainer 59 toward the retainer 62 when subjected to a very light load but as the retainer 59 approaches the retainer 62 the spring stiffens and requires a materially higher load to permit further movement.

The spring chamber 21 is connected to the vacuum existing in the intake of the engine by means of a passageway or bore 67 in the cover 17 and a mating bore 68 in the block 11. This passageway thereby vents the spring chamber 21 to vacuum existing in the engine intake.

Vacuum in the spring chamber 21 draws the diaphragm 19 into the chamber thereby shifting the metering valve assembly 52 against the action of the spring 66 and moving the metering valve head 53 into the passageway 32 for closing the metering orifice. When sufficient vacuum has been developed in the spring chamber 21, the sealing washer 54 will seat against the valve face 35 to seal the float chamber 20 from the passageway 37.

*Operation*

The device 10 receives supplementary fuel such as a mixture of alcohol and water through the tube 31. The float 25 controls the inlet valve 28 to admit the fuel to the float chamber 20. The vent 15b connecting the float chamber 20 with the passageway 42 and the vent 48 from the passageway 42 to the atmosphere maintains the float chamber under atmospheric pressure. Supplementary fuel under atmospheric pressure in the float chamber 20 is metered to the jet 46 by the tapered metering valve head 53. The size of the metering valve orifice is controlled by the degree of vacuum in the spring chamber 21 and by the setting of the spring 66.

When the engine is stopped and no vacuum exists in the chamber 21 the spring 66 opens the metering valve and fuel in the float chamber 20 flows by gravity through the bore 37 and jet 46 to rise in the tube 47 to the same level as exists in the float chamber. When the engine is started vacuum in the intake manifold 13 will draw the slug of supplementary fuel standing in the tube 47 into the manifold through the jet 14 thereby feeding an enriched slug of supplemental fuel to the engine immediately upon starting the engine.

As vacuum builds up in the intake manifold, the spring chamber 21 becomes evacuated to act on the diaphragm 19 for urging the metering valve 52 toward its closed position. The flow of supplementary fuel from the chamber 20 will thereupon be accurately metered by the valve head 53 and the rate of flow of the metered fuel to the tube 47 will be controlled by the needle valve 49 through the jet orifice 46. Air will be drawn into the tube 47 through the ports 47a and 47b to aerate the liquid being drawn through the tube and feed an aerated spray or jet to the nozzle 14. Whenever vacuum in the spring chamber 21 increases sufficiently to close the metering valve the tube 47 will be exhausted and air alone will be drawn through the tube and nozzle into the intake manifold which will lean out the main fuel mixture. This additional air added to the idle and part throttle mixture is compensated for by changing the idle mixture setting of the carburetor.

Since as indicated hereinabove the supplementary fuel need only be fed to the engine during those periods of operation where detonation occurs and since such periods vary with each engine, with the quality of fuel being burned, and with the altitude level or barometric pressure of the atmosphere surrounding the engine, the device of this invention should be adjusted to meet the operating characteristics and these adjustments are readily made by controlling the spring setting through shifting of the retainer 62 and by controlling the jet orifice by shifting of the needle valve 49.

As shown in the chart of Fig. 4 variation of the spring load on the metering valve 52 will shift not only the amount of feed but also the time of feed. In Fig. 4, as in the other charts of Figs. 5 and 6, vacuum of the engine intake measured in inches of water is plotted as abscissa and feed of supplemental fuel measured in cubic centimeters per minute is plotted as ordinates. In Fig. 4 curves numbered 1 to 8 inclusive show the effect of increasing the spring load on the metering valve. The data for these curves was obtained with the needle valve 49 set to maintain a fixed jet orifice of .052 inch. In curve No. 1 only a light initial spring load was maintained on the metering valve 53. In curves 2 to 8 inclusive the spring load on the metering valve 53 was increased by one turn of the screw member 63. Thus the retainer 62 was shifted toward the retainer 59 to increase the spring load or degree of initial compression of the spring 66. It will be noted from curves 1 to 8 of Fig. 4 that increase of the spring load on the metering valve not only results in increased feed of supplementary fuel but also results in shifting of the point of maximum feed with reference to the degree of vacuum existing in the engine intake. The duration of maximum feed also increases slightly as the spring load is increased.

The chart of Fig. 5 illustrates the wide range of feed characteristics that can be obtained with the device of this invention. In Fig. 5 curve No. 1 illustrates feed characteristics obtained from the needle valve 49 is only one turn off of its seat in the jet orifice 46 and wherein the spring 66 is not compressed when the metering valve 53 is opened. In other words the spring is only subjected to light initial load. Curve No. 2 shows the feed characteristics obtained with the same jet orifice setting as in curve No. 1 but with the spring 66 subjected to an initial spring load equivalent to seven turns of the screw member 63 from the initial position for curve 1. It will be noted that the increased spring load results not only in an increase of jet rate fuel feed but also a change in the duration of this rate. Curve No. 3 in Fig. 5 illustrates the feed characteristics obtained when the needle valve 49 has been moved off its seat for a total of seven turns and where the spring has been subjected to only the initial light load. Curve 3 compares with curve 1 in approximate duration and position of fuel feed with reference to vacuum but shows a widely increased rate of feed. Curve No. 4 of Fig. 5 shows a feed characteristic obtained when the needle valve is moved eight turns off of its seat and when the spring 66 is subjected to an initial load of seven turns of the member 63 from the initial position for curve 1. Curve 4 compares with curve 2 in timing and duration of flow but shows a higher rate of flow due to the increased size of the jet orifice. Curves 1 to 4 of Fig. 5 clearly indicate that the device 10 of this invention can be widely adjusted by regulation of the position of the needle valve 49 relative to the jet orifice 46 and by regulation of the spring load on the metering valve.

The curves of Fig. 6 show fuel feed characteristics desired for the average passenger car engine. These engines usually have a compression ratio of about 7½ to 1 and as shown by the curves are best economically serviced with anti-detonant fuel such as 50% mixture of water and alcohol if the spring load on the metering valve and the setting of the needle valve is adjusted to produce maximum supplementary fuel feeds at vacuums between 30 to 40 inches of water. The rates of maximum fuel feed may vary between 60 to 80 cubic centimeters per minute. For average passenger car operation therefore the adjustable needle valve feature of the invention can be eliminated and a fixed orifice size for the jet orifice 46 can be used. The adjustable spring setting for the metering valve will thereupon suffice for shifting of the quantity and duration of fuel feed. Should a low quality of main fuel be used or should the engine develop part throttle detonation, the spring can be adjusted so that the device will operate to feed supplemental fuel to the engine in accordance with its requirements. The adjustment in addition makes possible the setting of the device to take care of variations in manufacturing tolerances.

I have shown a practical and efficient embodiment of the various features of my invention but I do not desire to be limited to the exact arrangement and operation shown and described as changes and modifications may be made without departing from the scope of the invention as defined in the appended claims.

I claim as my invention:

1. A fluid feed device comprising a casing having a spring chamber subjected to suction and a fluids chamber with an inlet and an outlet, a diaphragm separating said chambers, a metering valve movable with said diaphragm to control flow through said outlet, said casing having a discharge passageway subjected to suction and fed by said metering valve, an upstanding tube in said passageway, said tube having ports therein at different levels, an atmospheric vent for said passageway communicating with the interior of said tube through said ports, means in said passageway defining a jet orifice communicating with the lower end of said tube, a needle valve adjustable from outside of said casing controlling the effective size of said orifice, a spring in said spring chamber acting on said metering valve and said diaphragm, and means accessible from outside of said casing for regulating the initial load on said spring, suction in said spring chamber acting on said diaphragm to shift the metering valve in opposition to said spring.

2. A fluid feed device comprising a casing having a float chamber and a spring chamber, a diaphragm separating said chambers, a fluid inlet and a fluid outlet for said float chamber, a float in said float chamber, a valve actuated by said float coacting with said inlet to maintain a predetermined level of fluid in said float chamber, a metering valve movable with said diaphragm and coacting with said outlet to regulate flow of fluid out of the float chamber, spring means in said spring chamber acting on said diaphragm and having a dual spring ratio to resist initial closing movements of the valve at a low rate followed by a higher rate of resistance for closing movements of the valve beyond said initial movements, a discharge passageway for connecting said outlet with an evacuated source, said passageway including a vented upstanding portion, a conduit tube in said upstanding portion of the passageway arranged to receive fluid from the outlet therethrough, a jet orifice controlling rate of fluid flow through said tube, said tube having a plurality of ports at different levels therein joining the interior of the tube with the vented upstanding portion of the passageway, said casing having a second passageway for connecting the spring chamber with the evacuated source, and spring adjustment means accessible from the exterior of said casing for varying the spring load on said dual rate spring to change the fuel feed characteristics of the device.

3. A device for feeding supplementary fluid to the fuel intake of an internal combustion engine which comprises a cup-shaped casing having a float chamber defining portion, an outlet from said float chamber, and an upstanding discharge passageway connecting said outlet with the upper portion of the casing, a cover for said casing, a diaphragm between the casing and cover, said cover having a domed chamber therein with a rib along the dome portion thereof, a spring in said cover, a spring retainer in said cover rideable along said rib, a screw member rotatable from outside of said cover for shifting said retainer, a second spring retainer mounted on said diaphragm, a compression spring between said retainers, said cover having an inlet communicating with said float chamber of the casing, a valve in said inlet, a float in said float chamber actuating said valve, a metering valve movable with said diaphragm controlling said outlet, a jet orifice in said discharge passageway, a needle valve accessible from outside of said casing controlling the effective size of said orifice, an upstanding tube in said discharge passageway receiving fluid from said jet orifice, said tube having ports therein at different levels, means venting the upper portion of the discharge passageway with the atmosphere, said cover having a passageway receiving the upper end of said tube and arranged for connection with the intake of an engine, and said cover having a second passageway communicating with the chamber of said cover and arranged for connection to the intake of said engine to act on said diaphragm for shifting said metering valve.

4. A fluid feed device adapted to supply supplementary fuel to the fuel intake of an internal combustion engine, said fluid feed device comprising a container for a pond of supplementary fuel, an outlet at the bottom of said container, an upstanding tube receiving fuel from said outlet, means for connecting the upper end of said tube with the fuel intake of an engine, said tube having ports at different levels, means for venting the exterior of the tube to the atmosphere at a level above said ports, a jet controlling the rate of feed from said outlet to said tube, a diaphragm covering the top of said pond, a metering valve controlling flow through said outlet at the bottom of said pond and attached to said diaphragm, spring means acting on one side of said diaphragm to urge the metering valve toward opened position, and means for connecting the other side of said diaphragm to a source of varying suction for varying the load on said spring means to change the setting of the metering valve.

5. In combination a mounting flange having a central passage and arranged for insertion between a carburetor and the fuel intake of an internal combustion engine, a discharge nozzle tube extending into the central passage of said flange, a housing composed of a cover and a cup-shaped casing, said cover having a side wall for mating with the side wall of said flange together with a passageway for communicating with said nozzle, said cup-shaped casing having an upstanding passageway vented at its upper end to the atmosphere and aligned with said passageway in the cover, an upstanding tube in said passageway of the casing communicating with the passageway of the cover and having ports at different levels to join the interior of the tube with the vented passageway below the vent opening to the passageway, a diaphragm between said cover and said casing, a metering valve controlling flow from the casing to said upstanding passageway and movable with said diaphragm, an orifice in said passageway controlling the rate of flow into said tube, a spring in said cover acting on said diaphragm for urging the metering valve toward opened position, said cover having a passageway joining the interior of the cover with said flange, said flange having a mating passageway for venting the interior of the cover to the central aperture of the flange, fluid pressure means adapted to be connected to a source of varying suction pressure and effective to draw the diaphragm into the cover for closing the metering valve, and means for changing the spring load of said spring to vary the metering period of operation of said device.

6. A fluid feed device comprising a cup-shaped casing defining a float chamber, an outlet in said casing at the bottom of said chamber, a passageway in said casing extending laterally from said outlet, an upstanding passageway in said casing communicating with said laterally extending passageway, a plate overlying said casing and having an aperture aligned with said upstanding passageway, a valve housing carried by said plate, a diaphragm overlying said plate, a cover overlying said diaphragm, said cover having an inlet receiving said valve housing, a valve in said housing controlling flow from the inlet to the float chamber, a float in said chamber actuating said valve, a passageway in said cover aligned with the aperture in said plate, a tube in said upstanding passageway of the casing extending snugly through the aperture in said plate into the passageway in said cover, a spring in said cover acting on said diaphragm, means accessible from outside of said cover for changing the load on said spring, and a metering valve attached to the diaphragm and having a tapered head movable in the outlet of said casing together with a sealing face adapted to close said outlet.

7. A detonation suppressor comprising a unit attachable to the fuel intake of an engine for feeding antidetonant to the intake, an intake vacuum actuated valve controlling periods of feed to said intake, a double pitch spring resisting vacuum shifting of said valve, spring adjustment means for varying said periods of feed, an orifice means controlling the rate of said feed, and a vent tube for aerating the antidetonant to furnish a spray of antidetonant to the intake.

8. A fluid feed device comprising a casing having a float chamber and a spring chamber, a diaphragm between said chambers, a fluid inlet and a fluid outlet for said float chamber, a float in said float chamber, a valve actuated by said float coacting with said inlet to maintain a predetermined level of fluid in said float chamber, a metering valve movable with said diaphragm and coacting with said outlet to regulate flow of fluid out of the float chamber, spring means in said spring chamber acting on said diaphragm and having a dual spring ratio to resist initial closing movement of the valve at a low rate followed by a high rate of resistance for closing movements of the valve beyond said initial movements, a discharge passageway for connecting said outlet with an evacuated source, said passageway including a vented upstanding portion, a conduit tube in said upstanding portion of the passageway arranged to receive fluid therethrough as it flows through the passageway, a jet orifice controlling rate of fluid flow through said tube, said tube having a plurality of ports at different levels therein joining the interior of the tube with the vented upstanding portion of the passageway and said casing having a second passageway adapted to connect the spring chamber with the evacuated source for controlling the metering valve.

DAVID E. ANDERSON.

REFERENCES CITED

The following references are of record in the file of this patent:

UNITED STATES PATENTS

| Number | Name | Date |
|---|---|---|
| 1,467,222 | Aseltine | Sept. 4, 1923 |
| 1,506,166 | Durrant | Aug. 26, 1924 |
| 1,552,995 | McKenzie-Martyn | Sept. 8, 1925 |
| 1,727,197 | Bryan et al. | Sept. 3, 1929 |
| 1,758,897 | Evans | May 13, 1930 |
| 1,889,584 | Zimmerer | Nov. 29, 1932 |
| 1,923,473 | Beard | Aug. 22, 1933 |
| 1,924,595 | Chandler | Aug. 29, 1933 |
| 2,388,085 | Russell | Oct. 30, 1945 |
| 2,441,301 | Waag | May 11, 1948 |